(12) United States Patent
Rehder et al.

(10) Patent No.: US 7,354,079 B2
(45) Date of Patent: Apr. 8, 2008

(54) CONNECTOR

(75) Inventors: Randall J. Rehder, Wilmington, NC (US); Gary Hutko, Wilmington, NC (US); L. James Knowles, Wilmington, NC (US)

(73) Assignee: Watts Sea Tech, Inc., North Andover, MA (US)

( * ) Notice: Subject to any disclaimer, the term of this patent is extended or adjusted under 35 U.S.C. 154(b) by 161 days.

(21) Appl. No.: 10/952,484

(22) Filed: Sep. 28, 2004

(65) Prior Publication Data

US 2005/0275221 A1    Dec. 15, 2005

Related U.S. Application Data

(63) Continuation-in-part of application No. 10/406,639, filed on Apr. 2, 2003, now abandoned.

(60) Provisional application No. 60/374,709, filed on Apr. 23, 2002.

(51) Int. Cl.
*F16L 21/06* (2006.01)

(52) U.S. Cl. .................... 285/322; 285/323; 285/307

(58) Field of Classification Search .............. 285/322, 285/307, 319, 323, 243
See application file for complete search history.

(56) References Cited

U.S. PATENT DOCUMENTS

| | | | |
|---|---|---|---|
| 2,485,874 A * | 10/1949 | Forst | 72/409.03 |
| 2,635,901 A * | 4/1953 | Osborn | 285/33 |
| 3,653,689 A * | 4/1972 | Sapy et al. | 285/113 |
| 4,059,295 A | 11/1977 | Helm | |
| 4,573,716 A | 3/1986 | Guest | |
| 4,606,783 A | 8/1986 | Guest | |
| 4,645,246 A | 2/1987 | Guest | |
| 4,657,286 A | 4/1987 | Guest | |
| 4,722,560 A | 2/1988 | Guest | |
| 4,807,911 A | 2/1989 | Short | |
| 4,946,213 A | 8/1990 | Guest | |
| 5,029,908 A | 7/1991 | Belisaire | |
| 5,038,455 A | 8/1991 | Guest | |
| 5,174,611 A | 12/1992 | Byrd et al. | |
| 5,230,539 A | 7/1993 | Olson | |
| 5,487,572 A | 1/1996 | Combot-Courrau et al. | |
| 5,549,865 A | 8/1996 | Guests | |

(Continued)

FOREIGN PATENT DOCUMENTS

EP    0 268 511 A1    10/1987

(Continued)

*Primary Examiner*—David Bochna
(74) *Attorney, Agent, or Firm*—Fish & Richardson P.C.

(57) ABSTRACT

A tube connector including a tubular connector body having an inboard contact surface facing an outboard open end, a collet extending into the open end and towards the contact surface, and an o-ring positioned between the collet and the contact surface. The o-ring provides a fluid-tight seal between the connector body and an outer circumference of a tube inserted through the collet and into the connector body. The connector also includes a relatively rigid ring guide positioned between the o-ring and the collet. The ring guide is adapted to protect the o-ring and maintain the o-ring in a proper position for providing a fluid-tight seal and includes a sloped or radiused outboard surface for guiding an inserted tube and a sloped inboard surface for contacting the o-ring.

9 Claims, 8 Drawing Sheets

U.S. PATENT DOCUMENTS

| | | |
|---|---|---|
| 5,564,757 A | 10/1996 | Seabra |
| 5,584,513 A | 12/1996 | Sweeny et al. |
| 5,779,284 A | 7/1998 | Guest |
| 5,895,078 A | 4/1999 | Le Clinche |
| 5,909,902 A | 6/1999 | Seabra |
| 5,911,443 A | 6/1999 | Le Quere |
| 5,933,556 A | 8/1999 | Hawkins |
| 6,056,326 A | 5/2000 | Guest |
| 6,065,779 A | 5/2000 | Moner et al. |
| 6,145,887 A | 11/2000 | Cambot-Courrau |
| 6,206,435 B1 | 3/2001 | Le Clinche |
| 6,349,978 B1 | 2/2002 | McFarland et al. |
| 6,378,915 B1 | 4/2002 | Katz |
| 6,447,019 B1 | 9/2002 | Hosono et al. |
| 6,464,266 B1 | 10/2002 | O'Neill et al. |
| 6,517,124 B1 * | 2/2003 | Le Quere ............... 285/340 |

FOREIGN PATENT DOCUMENTS

| | | |
|---|---|---|
| EP | 0554111 A1 | 8/1993 |
| EP | 0558844 B1 | 9/1993 |
| EP | 0598954 A1 * | 6/1994 |
| EP | 1032785 | 12/2002 |
| GB | 2211506 A | 7/1989 |
| GB | 2331564 A | 5/1999 |

* cited by examiner

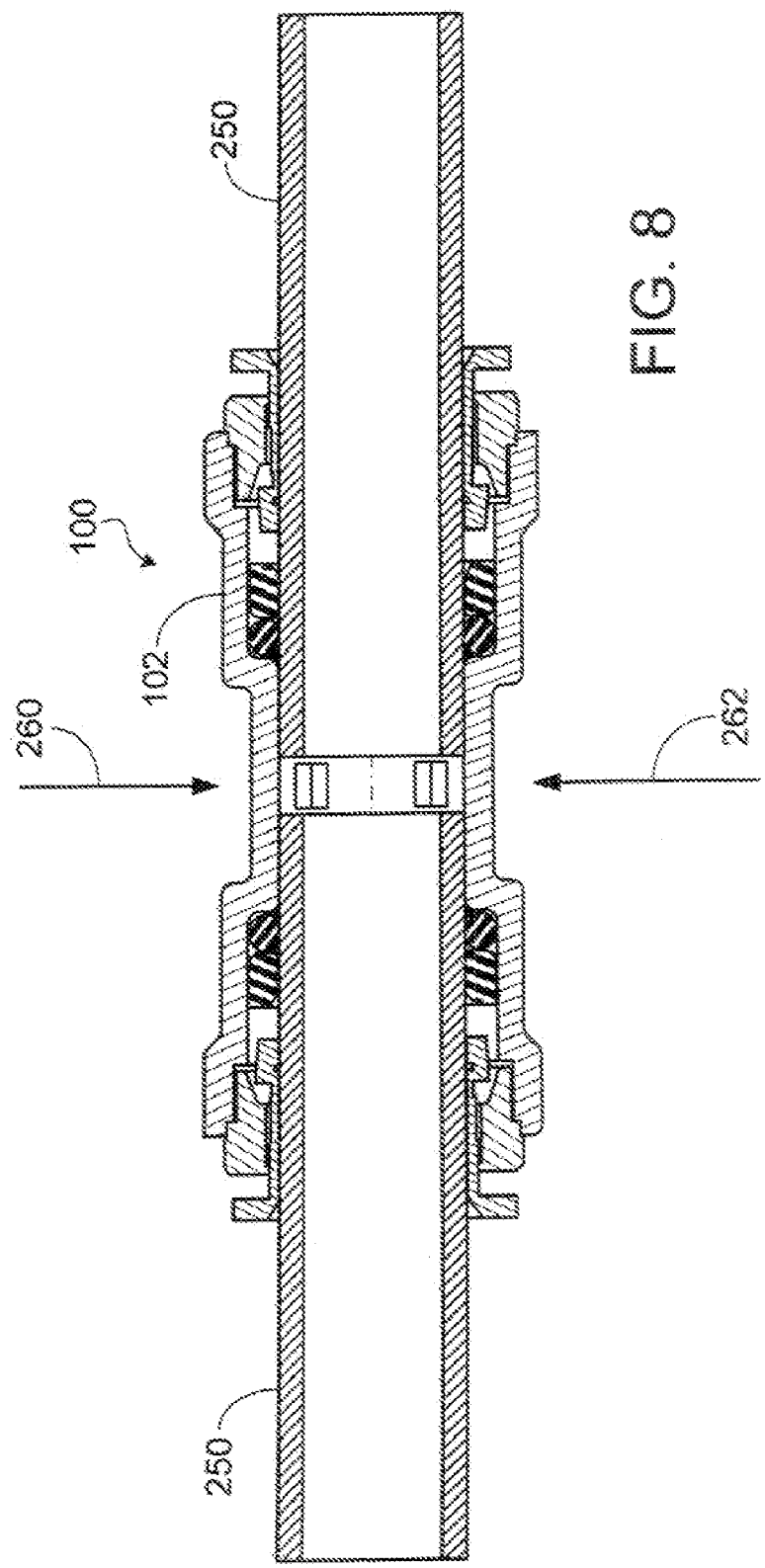

CONNECTOR

CROSS-REFERENCES TO RELATED APPLICATIONS

This application is a continuation-in-part of U.S. patent application Ser. No. 10/406,639, filed 2 April 2003 now abandoned, which claims the benefit of U.S. Provisional Application 60/374,709, filed 23 April 2002, under 35 USC 119(e), and is related to copending U.S. patent application Ser. No. 10/405,901, filed on 2 April 2003, each application hereby incorporated by reference.

BACKGROUND OF THE INVENTION

1. Field of the Invention

This invention relates to plumbing connectors and, in particular, this invention relates to reversible connectors for tubing.

2. Background

Connectors for plumbing conductors such as tubing are known. One class of connectors reversibly connects substantially smooth tubing pieces by means of friction-inducing surfaces.

Connectors with friction-inducing surfaces offer the favorable attributes of 1) being joined to connectors without requiring extra materials, e.g., solder, flux; 2) easily separating joined tubing and connectors; and 3) easily reconfiguring supply plumbing to accommodate changing needs or demands. In spite of the foregoing favorable attributes, connectors with friction-inducing surfaces also have shortcomings. One shortcoming is that leakage frequently occurs because the tubing is not correctly aligned with the seal in the connector. Another shortcoming is that leakage is frequently induced by lateral pressures on the seals. The leakage frequently occurs because the lateral pressure displaces the tubing to the extent that the seal can no longer provide a fluid-tight fit thereto. Yet another shortcoming is that leakage frequently occurs to seal damage caused by misaligning the connector and tubing when these components are being joined.

There then is a need for a connector with friction-inducing surfaces which is self-aligning with respect to tubing being inserted therein, which will sustain lateral forces without leakage, and which will offer an enhanced degree of protection to seals when the connector is being mated to a piece of tubing.

SUMMARY OF THE INVENTION

This invention substantially meets the aforementioned needs of the industry by providing a connector with friction-inducing surfaces which 1) is self-aligning with respect to tubing being inserted therein; 2) will sustain lateral forces without leakage; and 3) offers an enhanced degree of protection to seals when the connector is being mated to a piece of tubing.

It is an aspect of the present invention to provide a connector, the connector including a connector body, a collet, a positionable ring guide, and a seal. The connector body may define a connector fluidic passageway. The collet may be disposable in the connector passageway and may include friction-inducing surfaces, such as an annular arrangement of a plurality of teeth. The ring guide may be disposed in the connector body passageway inboard with respect to the collet. The seal may be disposed in the connector passageway inboard with respect to the ring guide.

It is another aspect of the present invention to provide a process of forming a fluid-tight seal between a connector and a tubing piece. The connector may include a connector body, a collar, a collet, a seal, and a guide. The connector body may define an interior passageway. The collar may be affixed in the connector body at an end of the passageway. The collet may be removably held in place by the collar. The seal may be disposed in the interior passageway. The guide may be slidably held in place between the seal and the collar. The guide may include a radiused outboard surface. The process may include displacing the tubing piece to an opening in the collet; contacting the tubing piece to the guide radiused surface, thereby aligning the tubing piece; and inserting the tubing piece within the seal, thereby forming the fluid-tight seal.

It is yet another aspect of the present invention to provide a process of aligning a tubing piece with a seal, the seal disposed in a fluidic passageway of a connector body. A guide with a radiused outlet may be disposed outboard the seal in the passageway. A collet may be disposed in the passageway outboard the seal. The collet and guide may be held in place by a collar inserted in one end of the passageway. The process may include extending the tubing piece through an opening in the collet; and contacting the tubing piece to the guide radiused outlet, thereby aligning the tubing piece with the seal.

It is still another aspect of the present invention to provide a process of manufacturing a fluidic connector. The process may include disposing a seal within a passageway formed within a connector body; placing a guide outboard the seal, the guide comprising a radiused outboard surface and a generally flat inboard surface; fixing a collar in one end of the passageway; and positioning a collet with in the collar.

It is a feature of the present connector to include a guide with a radiused outboard (inlet) surface. It is an advantage of the radiused outboard surface that tubing is self-aligned with respect to the seal when the tubing is being joined to the connector. It is another advantage of the radiused outboard surface that connectors having guides with this feature have an increased side load capacity. It is yet another advantage of the radiused outboard surface that seals are prevented from being dislodged in connectors having seals with this feature.

It is another feature of the present connector to include a collet made from a material including a polysulfone resin or a fiber or mineral reinforced polyamide or polypropylene resin, such as a nylon 66 resin reinforced with fiber. It is an advantage of the present invention that connectors with a collet made from the foregoing material are capable of functioning without failure at 150 psi and 210 degrees Fahrenheit for at least 720 hours and/or at 190 psi and 180 degrees Fahrenheit for at least 1000 hours.

These and other objects, features, and advantages of this invention will become apparent from the description which follows, when considered in view of the accompanying drawings.

DETAILED DESCRIPTION

All dimensions of the components in the attached figures may vary with a potential design and the intended use of an embodiment of the invention without departing from the scope of the invention. Each of the additional features and methods disclosed herein may be utilized separately or in conjunction with other features and methods to provide improved connectors and methods for making the same. Representative examples of the teachings of the present invention, which examples utilize many of these additional features and methods in conjunction, will now be described in detail with reference to the drawings. This detailed description is merely intended to teach a person of skill in the art further details for practicing preferred aspects of the present teachings and is not intended to limit the scope of the invention. Therefore, specific combinations of features and methods disclosed in the following detailed description may not be necessary to practice the invention in the broadest sense, and are instead taught merely to particularly describe representative and preferred embodiments of the invention.

One embodiment of a connector of the present invention is depicted in the figures generally at 100 and includes a connector body 102, and a connecting mechanism with a collet 104, a collar 106, a guide such as a first embodiment thereof depicted at 108, and sealing device, such as an O-ring 110. While a 180 degree union connector is depicted, it should be appreciated that the present connector can encompass other connective configurations such as a union tee or an elbow. It should also be appreciated that the present connecting mechanism, as illustrated and disclosed infra, can be operably present at all openings of the present connector, or can be present along with mechanisms to connect the present connector to threaded conductors or conductors having other operable connecting features (e.g., soldering joints).

Figure 1:
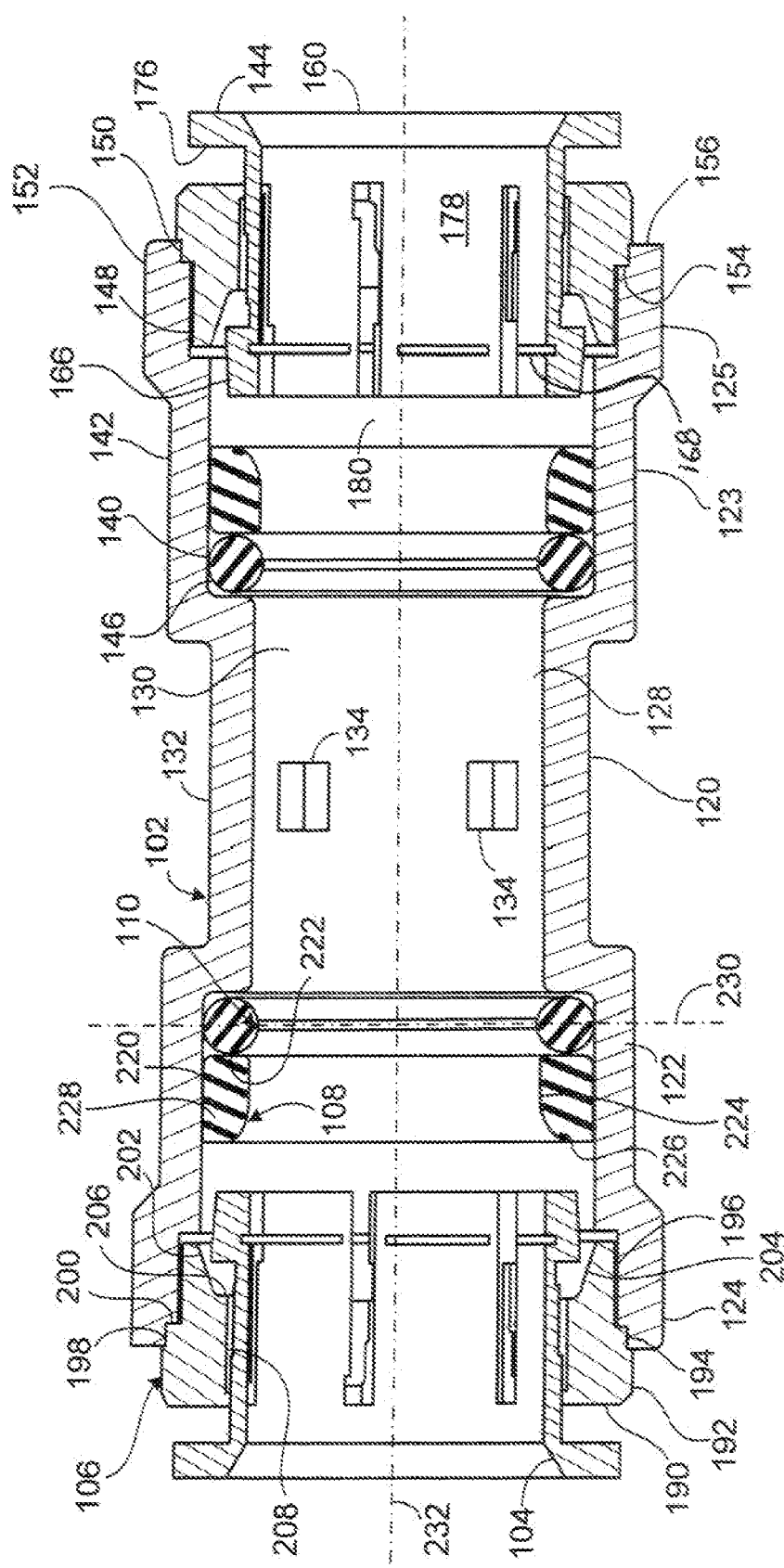
FIG. 1 is a cross section of one embodiment of a fluidic connector of this inventor.

Referring to FIG. 1, the connector body 102 may unitarily, or otherwise integrally, include a first (middle) section 120, at least one second section, e.g., second sections 122 and 123, and at least one third section, e.g., third sections 124 and 125. The second sections 122 and 123 are outboard the first section 120 and the third sections 124 and 125 are outboard the respective second sections 122 and 123. The first section 120, the second sections 122 and 123, and the third section 124 and 125 cooperate to define a fluidic passageway 128 therethrough. It should be recognized in this embodiment, that the second sections 122 and 123 are substantially identical and are oriented in mirror-image fashion with respect to each other. It should be further recognized that the third sections 124 and 125 are also substantially identical and are likewise oriented in a mirror-image fashion with respect to each other.

Figure 2:
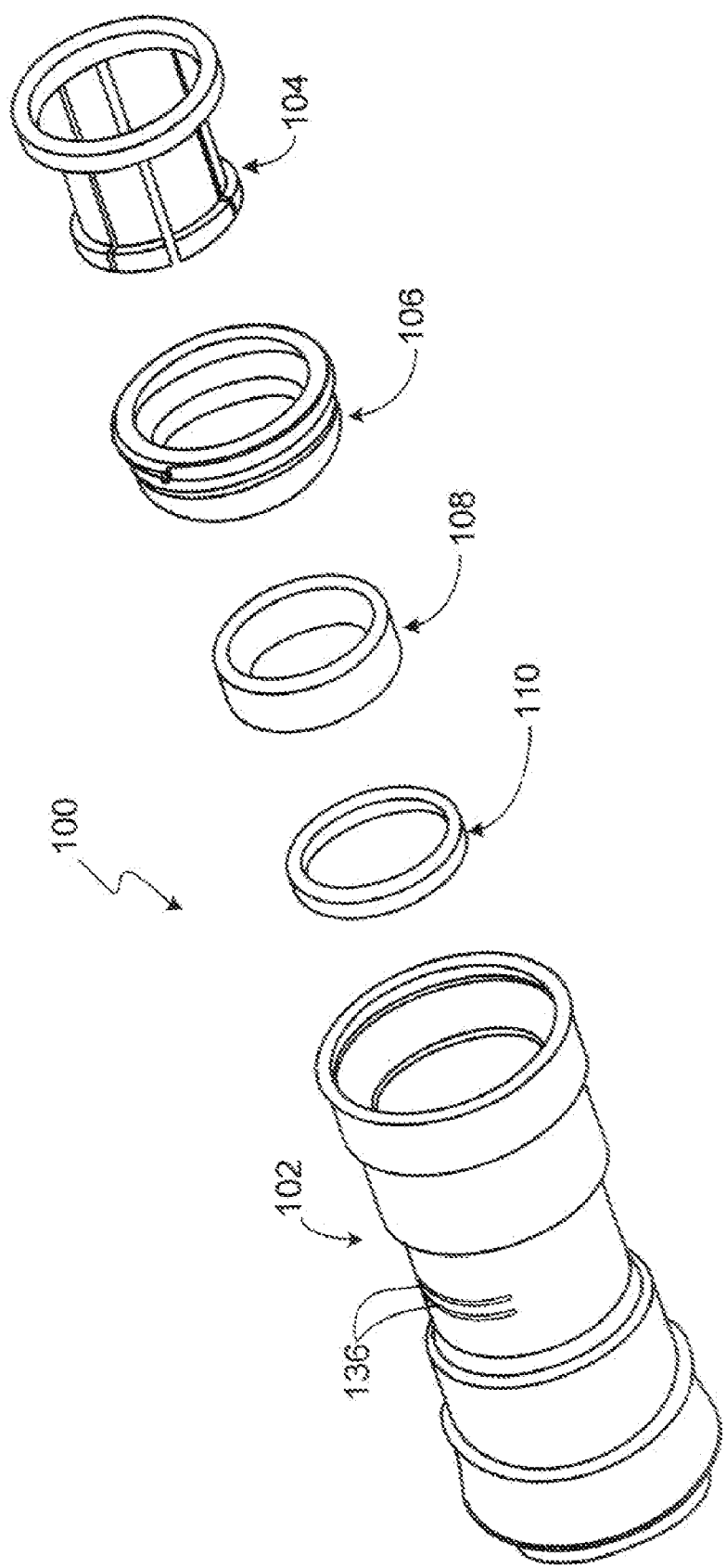
FIG. 2 is a perspective, exploded view of the connector of FIG. 1.
Figure 3:
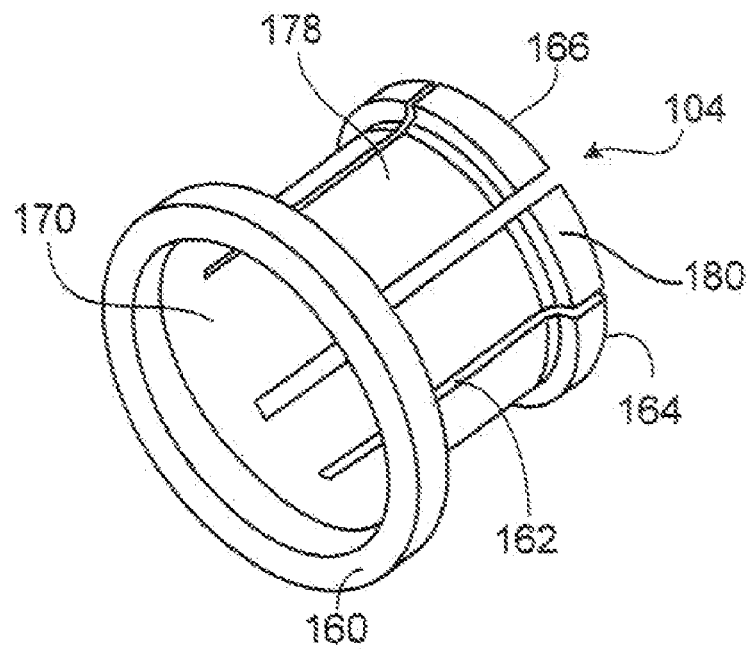
FIG. 3 is a perspective view of one embodiment of a collet used in the connector of FIG. 1.
Figure 4:
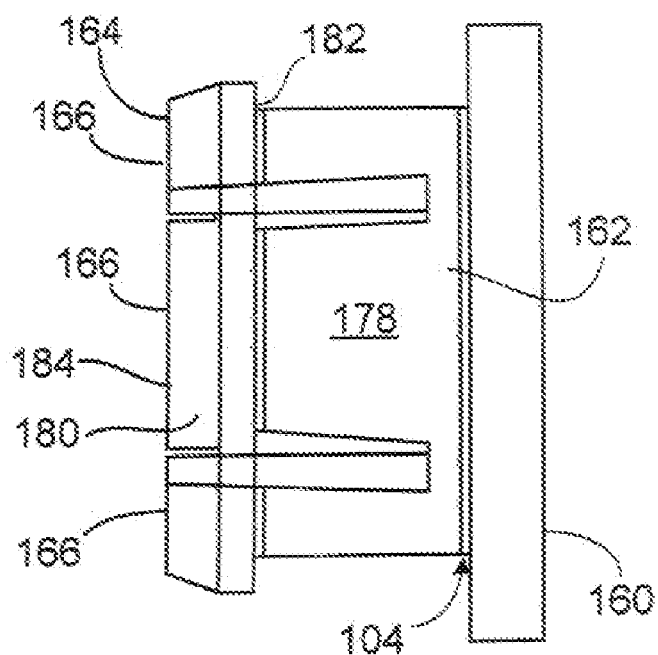
FIG. 4 is a plan view of the collet of FIG. 3.

The first section 120 displays respective interior and exterior surfaces 130 and 132. A plurality of stops 134 extend from the interior surface 130. Indicia, such as a pair of optional insertion depth marks 136 (FIG. 2), may be present on the exterior surface 132.

Because the second sections 122 and 123 and the third sections 124 and 125 have substantially identical components in this embodiment, identical numbering shall be used to indicate substantially identical elements for these sections. The second sections 122 and 123 display interior surfaces 140 and exterior surfaces 142. Both the interior surfaces 140 and the exterior surfaces 142 are "stepped out," that is have larger diameters than the interior surface 130 and exterior surface 132 of the adjoining first section 120. Contact surfaces 144 are formed at the outboard ends of the first section 120. Other contact surfaces 146 are formed by the interior surfaces 140 of the second sections 122 and 123 proximate their junctions to the first section 120. The third sections 124 and 125 display respective inner surfaces 148 and 150, exterior surfaces 152, end surfaces 154, and end surfaces 156. The interior surfaces 150 are stepped-out from the interior surfaces 148 and the outer surfaces 154 extend between the interior surfaces 148 and 150.

As depicted in FIGS. 1-4, the collet 104 may unitarily, or otherwise integrally, include a rim 160, a cylindrical member 162 extending from the rim 160, and a terminal lip portion 164 extending from the rim 160. Part of the cylindrical member 162 and lip portion 164 are divided into generally arcuate collet sections 166. A friction-inducing surface such as an exterior surface of a generally arcuate tooth 168 is embedded in each the lip portion of each collet section 166 so as to extend from an interior surface 170 thereof. In the embodiment depicted, there are six collet sections 166, although more or fewer collet sections 166 may be present. The rim 160 displays an outboard surface 174 and an inboard surface 176. The interior surface 170 extends continuously over the cylindrical and lip portion of each collet section 166. The cylindrical member portion of the each collet section 166 displays an exterior surface 178 and the exterior surface of the lip portion of each collet section 166 displays an exterior surface 180. Additionally, the lip portion of each collet section 166 displays an outboard surface 182 and an inboard surface 184.

Referring again to FIG. 1, the collar 106 displays a terminal outboard surface 190 and outer surfaces 192, 194, and 196. The outer surfaces 192-196 are stepped from a maximum diameter at outer surface 192 to a minimum diameter at outer surface 196. Respective inboard surfaces 198 and 200 extend between outer surfaces 192 and 194 and between outer surfaces 194 and 196. The collar 106 further displays a terminal inboard surface 202, an inner surface 204, an inboard surface 206, and an inner surface 208. The inner surface 204 slopes between a maximum diameter proximate inboard surface 202 and a minimum diameter proximate the inboard surface 206.

The guide 108 displays an exterior surface 220, an inboard surface 222, an interior surface 224, and an outboard surface 226. An arcuate (radiused) section 228 of the interior surface 224 curves between a maximum diameter proximate the remainder of the outboard surface 226 and a minimum diameter at surface 224. The guide 108 thus provides a large internal radius for an outboard (inlet) surface and a substantially flat inboard (outlet) surface 222 operably abutting the present O-ring 110. The surface 222 is generally orthogonal to a longitudinal axis of the connector body 102 and to the exterior surface 220. When inserted into the connector body 102, the present O-ring 110 may be envisioned as being bisected by a plane 230, the plane 230 being substantially orthogonal to a longitudinal axis 232 of the connector body 102. Moreover, when a tubing piece to be joined is aligned with the O-ring 110, the tubing piece will be substantially coaxial to the connector body longitudinal axis 232.

Figure 9:
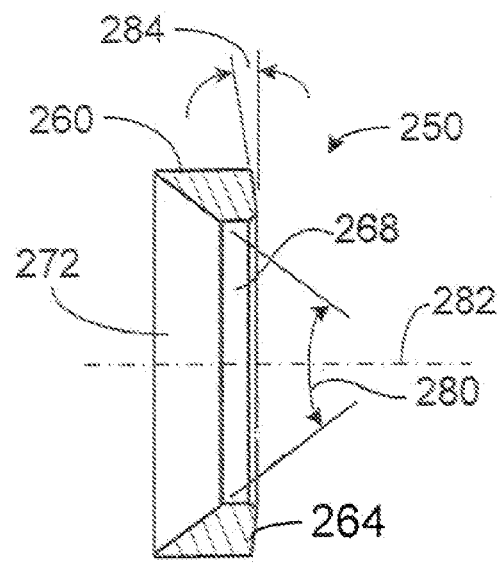
FIG. 9 is a partial cross section of a second embodiment of the guide of this invention.
Figure 10:
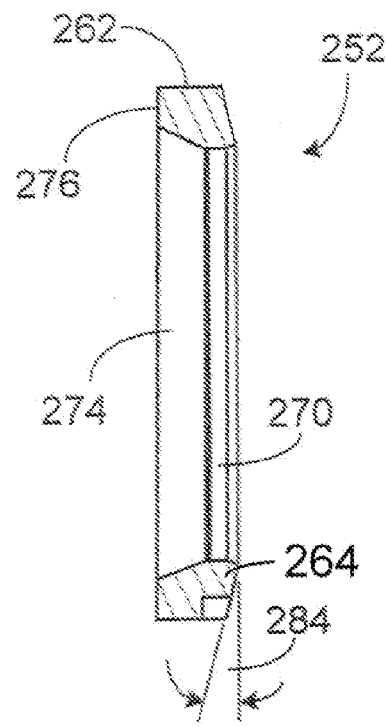
FIG. 10 is a partial cross section of a third embodiment of the guide of this invention.
Figure 1:
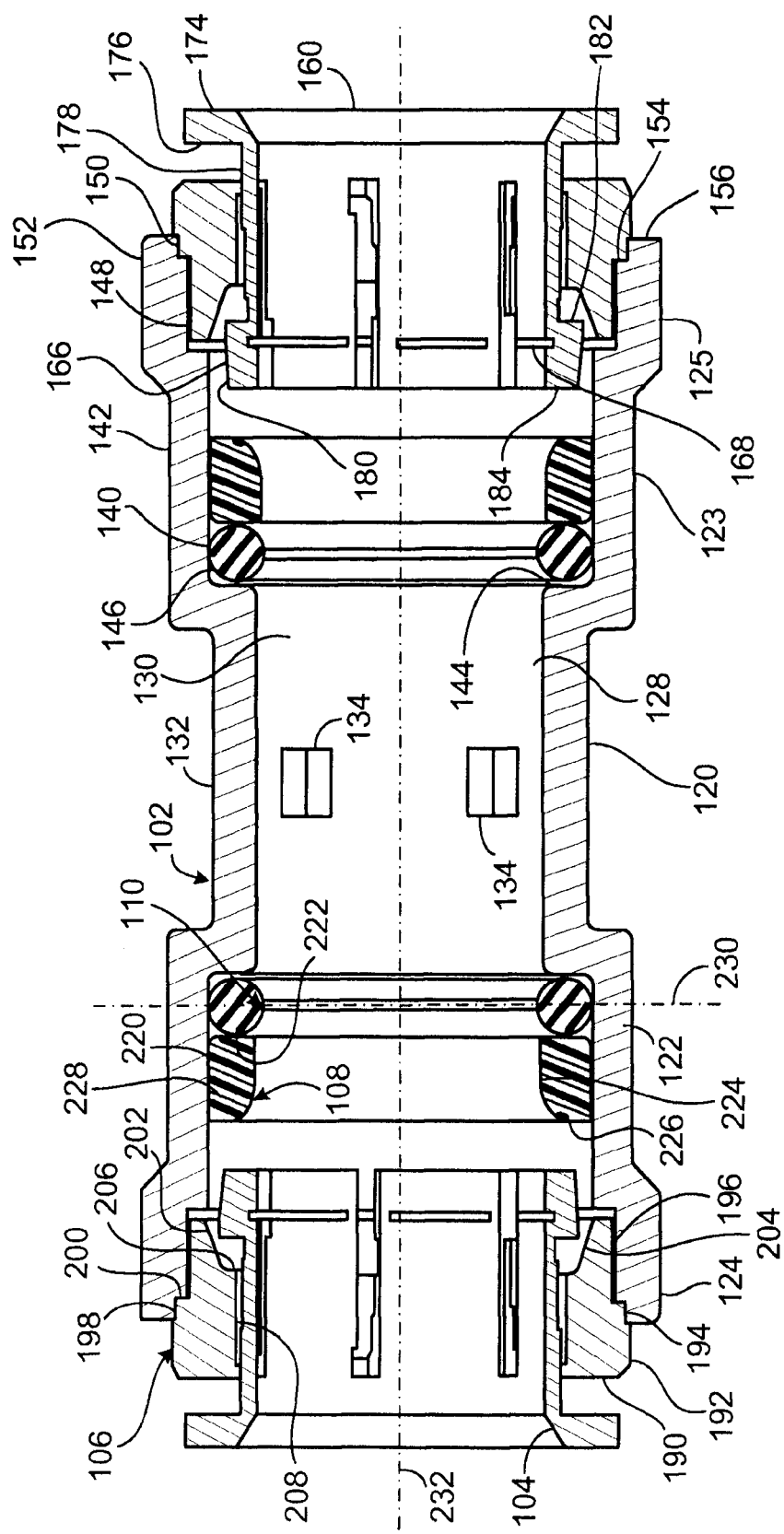
Figure 2:
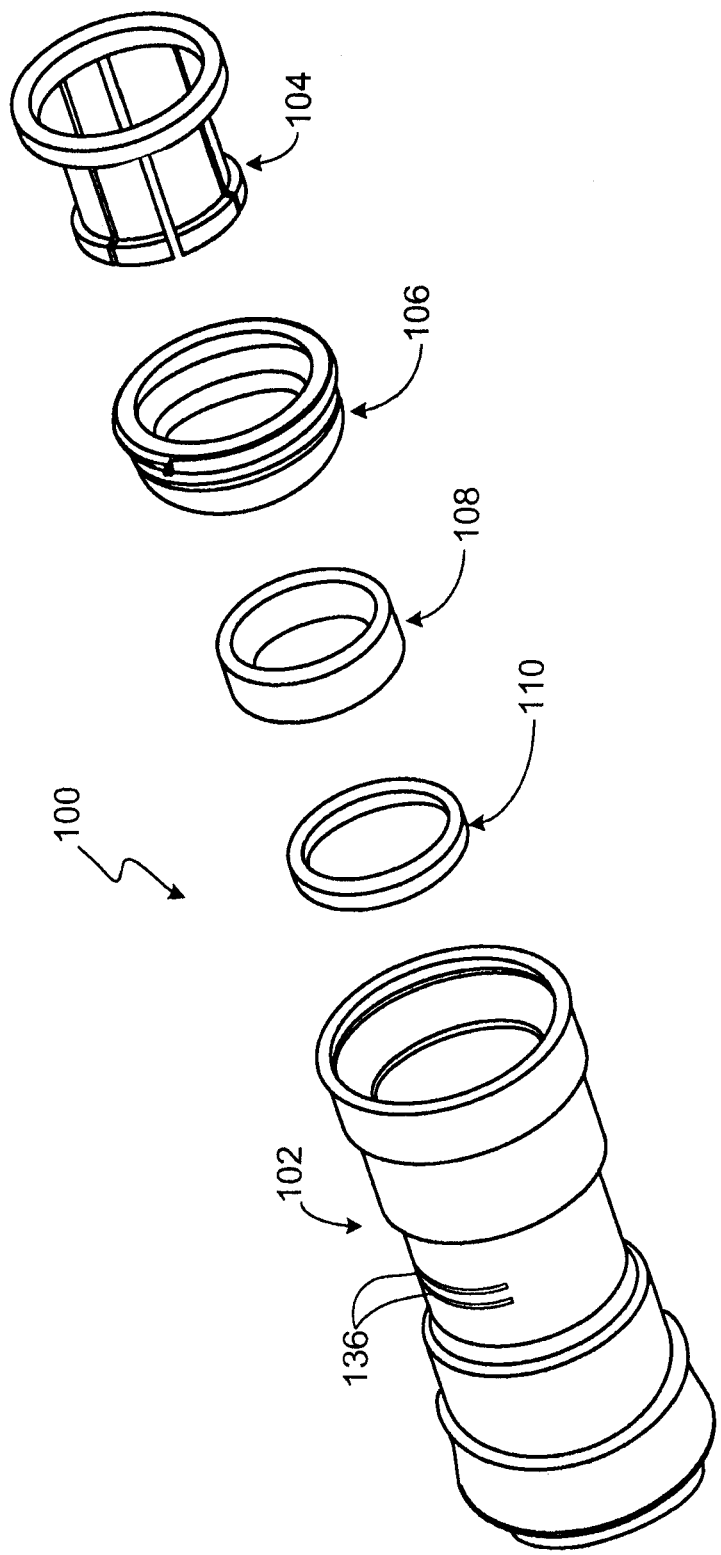
Figure 3:
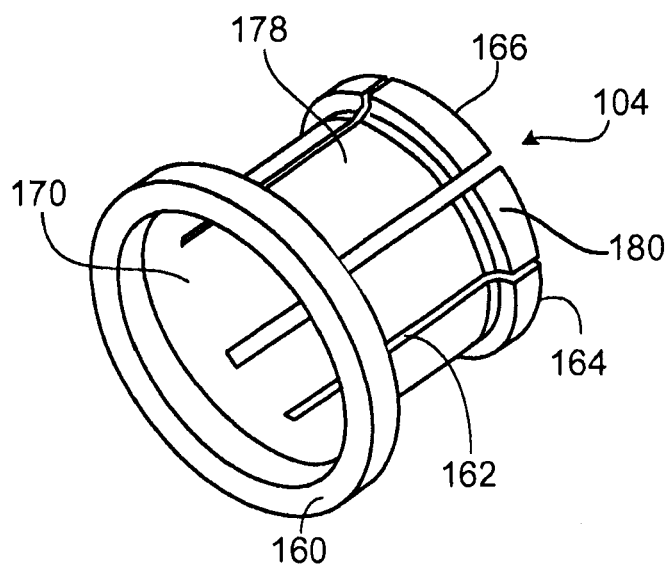
Figure 4:
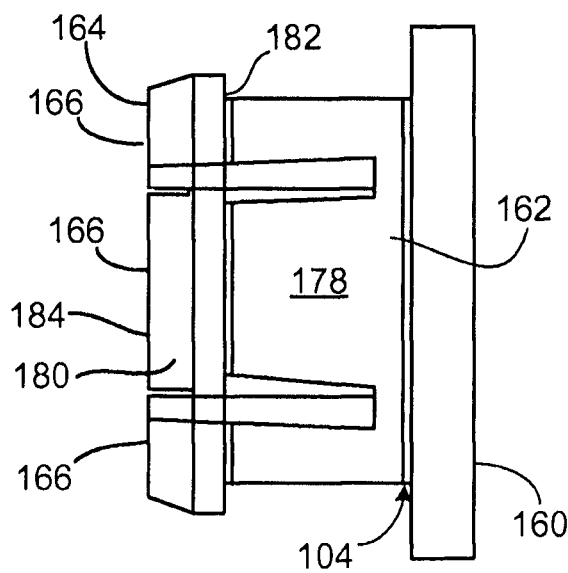
Figure 5:
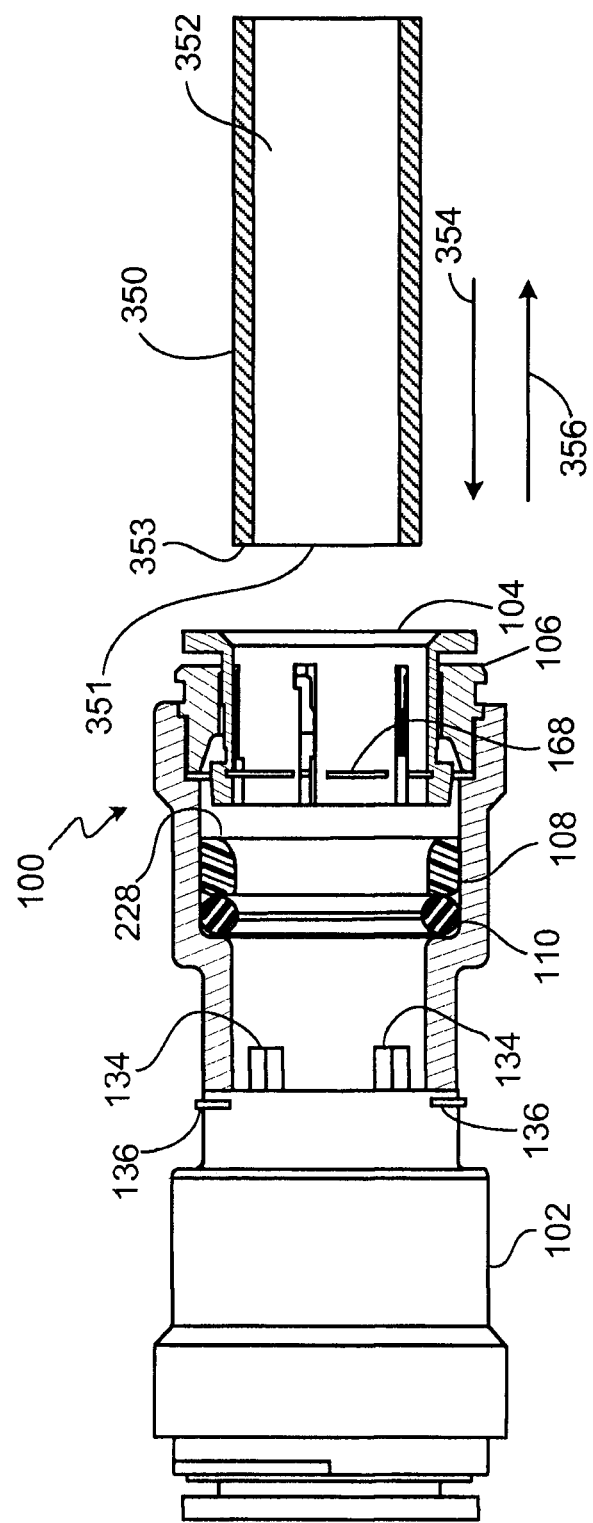
Figure 6:
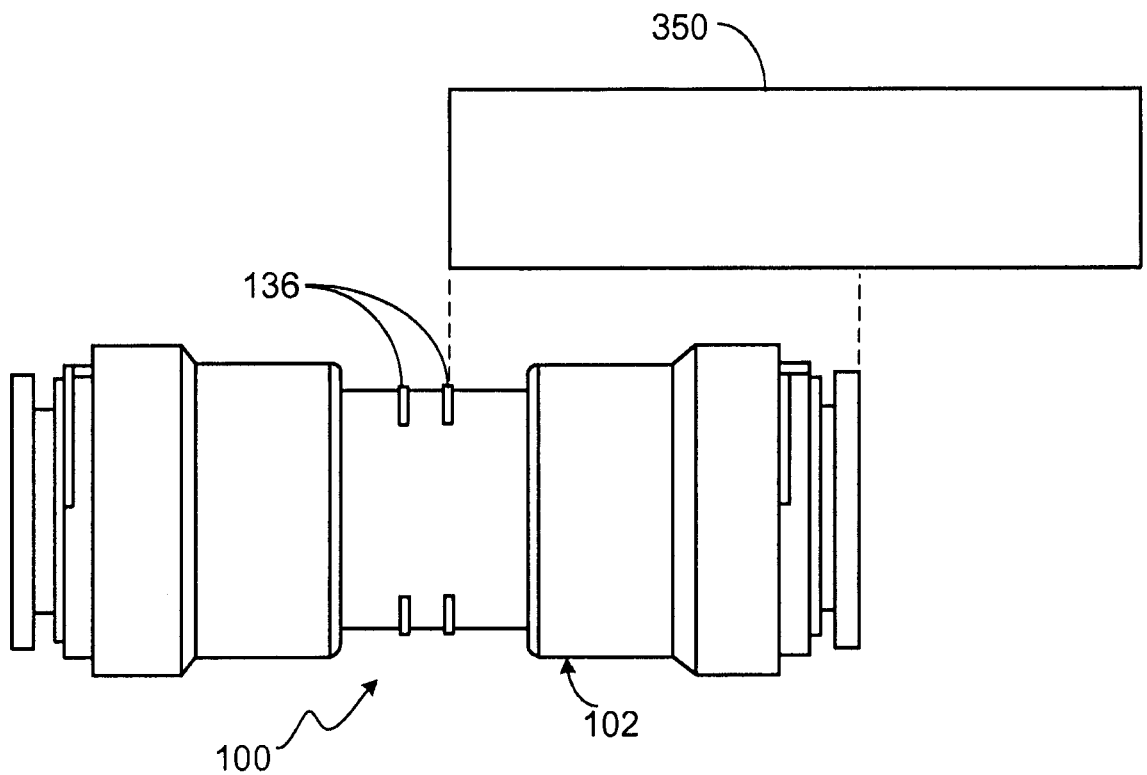
Figure 7:
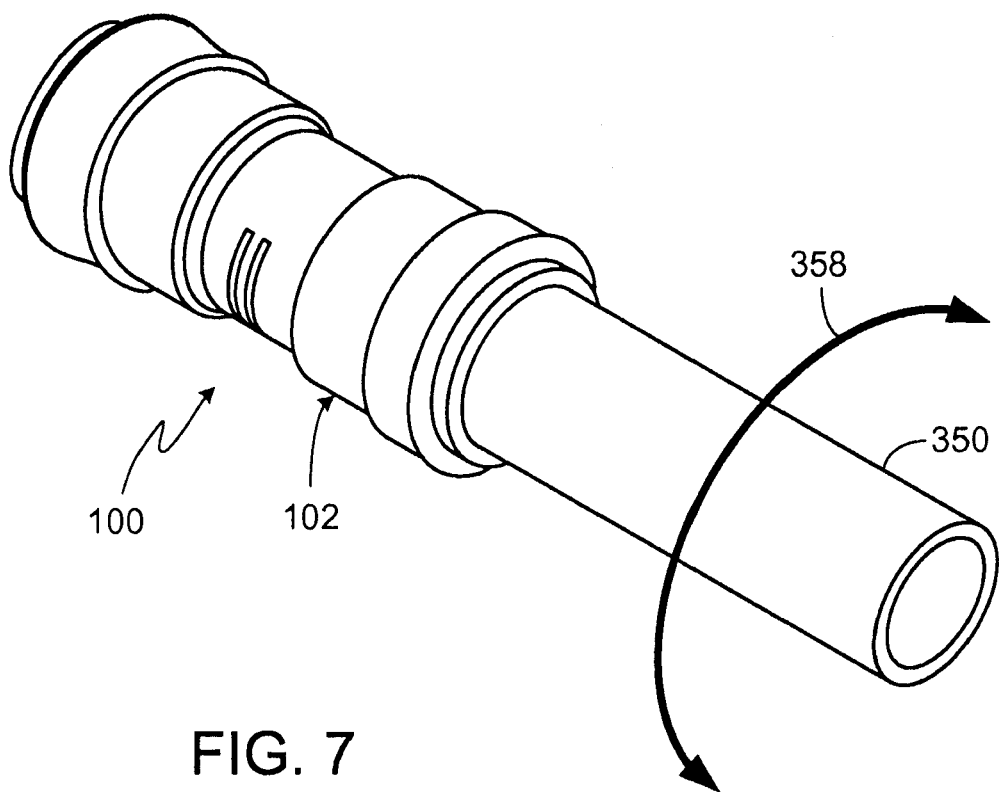

Turning to FIGS. 9 and 10, two more embodiments of the present guide are shown at 250 and 252. The guides 250 and 252 display respective exterior surfaces 260 and 262, inboard surfaces 264 and 266, interior surfaces 268 and 270, and outboard surfaces 272 and 274, the guide 252 having an additional outboard surface 276. The outboard surface 276 may angularly join the outboard surface 274 and orthogonally join the exterior surface 262. In contrast to the radiused surface of 228 of the guide 108, the outboard surfaces 272 and 274 may be generally frustoconical. Diagonally opposed portions thereof may extend in angles between about 50 degrees and 80 degrees, between about 60 degrees and 73 degrees, about 60 degrees, about 65 degrees, or about 73 degrees, the angle denoted at 280 in FIG. 9. Diagonally opposed portions of the outboard surfaces 272 and 274 may extend between a maximum diameter proximate the exterior surfaces 260 and 262 and a minimum diameter proximate interior surfaces 268 and 270. The outboard surfaces 272 and 274 present a generally sloped contact surface which guides pipes being inserted into the instant connector to be readily received in the space defined by the interior surfaces 268 and 270. In further contrast, the inboard surfaces 264 and 266 extend at an angle 284 that may depart from a generally perpendicular orientation with respect to the longitudinal axis 282 of guide 250 and 252, for example between about 5 degrees and 15 degrees, between about 7.5 degrees and 12.5 degrees, or about 10 degrees. It has been found that the sloped inboard surfaces 264 and 266 more effectively maintain the O-rings in position during use by exerting a slightly outward pressure on the O-rings. More effectively maintaining the O-rings in position during use thereby ensures a better seal between the O-ring and the pipe. As shown in FIGS. 9 and 10, a beveled surface 290 is provided at the juncture of the interior surfaces 268 and 270 and the inboard surfaces 264 and 266.

The present connector body, collar and guide may be made from any suitable material. One class of suitable materials is thermoplastic resins. A suitable thermoplastic resin is sold under the trademark Delrin® and may be obtained from Dupont®. However, other thermoplastics may be suitable for embodiments of the present connector body. Various thermoplastics, and properties thereof, are disclosed in "Handbook of Plastics, Elastomers, and Composites, Third Edition, Charles A. Harper (Editor-in Chief), McGraw-Hill, New York (1996), the entire disclosure of the foregoing document hereby incorporated by reference. A person of ordinary skill in the art will recognize that several thermoplastics in the foregoing document may be identified for specific embodiments of the present connector body, collar, and guide without undue experimentation.

The present collet may be made from a polysulfone resin or a fiber or mineral reinforced polyamide or propylene resin. Suitable resins include Zytel® and Minlon® 10B40 NC010, nylon 66 resins reinforced with mineral and obtainable from Dupont®. The above-referenced Handbook of Plastics, Elastomers, and Composites may contain several alternative suitable materials for the present collet which would be identifiable by a person of ordinary skill in the art without undue experimentation. In one embodiment, the present collet withstands the conditions under which the ASTM test for fittings (e.g., F877-01) is administered. These conditions may include operability at 150 psi and 210 degrees Fahrenheit for 720 hours or at 190 psi and 180 degrees Fahrenheit for 1000 hours. To the inventors' knowledge no collets, other than those advantageously made from Minlons have achieved the foregoing standard test. The teeth in the collet may be fashioned from metals such as aluminum, steel alloys, stainless steel, and the like.

The present O-ring may be made from several thermopolymers, such as those listed and described in the above-referenced "Handbook of Plastics, Elastomers, and Composites." One suitable material is ethylene-propylene-diene terpolymer (EPDM), which can be obtained from Parker Hannafin®. When used for connecting tubing to convey pressurized water, embodiments of the present connector, which operate satisfactorily under sustained pressures of 100 psi (6.8 bar) and 180 degrees Fahrenheit (82 degrees Celsius) may be desirable.

The present connector is assembled by inserting the O-ring 110 into the passageway 128 until the O-ring 110 rests against the contact surfaces 144 and 146. The guide 108 is then inserted such that the inboard surface 222 thereof abuttingly contacts the O-ring 110. The collar 106 is then pressed into the passageway 128 and may be fixed in place by such means as heat or sonic welding, adhesives, and the like. Suitable adhesives may be selected from the above-referenced "Handbook of Plastics, Elastomers, and Composites" by a person of ordinary skill in the art without undue experimentation. When the collar 106 is in place, the guide 108 can be readily slid between the space between the O-ring 110 and the collar 106. The collet 104 is then pressed inside an opening formed by the collar 106. The installed collet 104 may subsequently be readily removed so that the collet 104, itself, and the O-ring 110 may be replaced.

Figure 5:
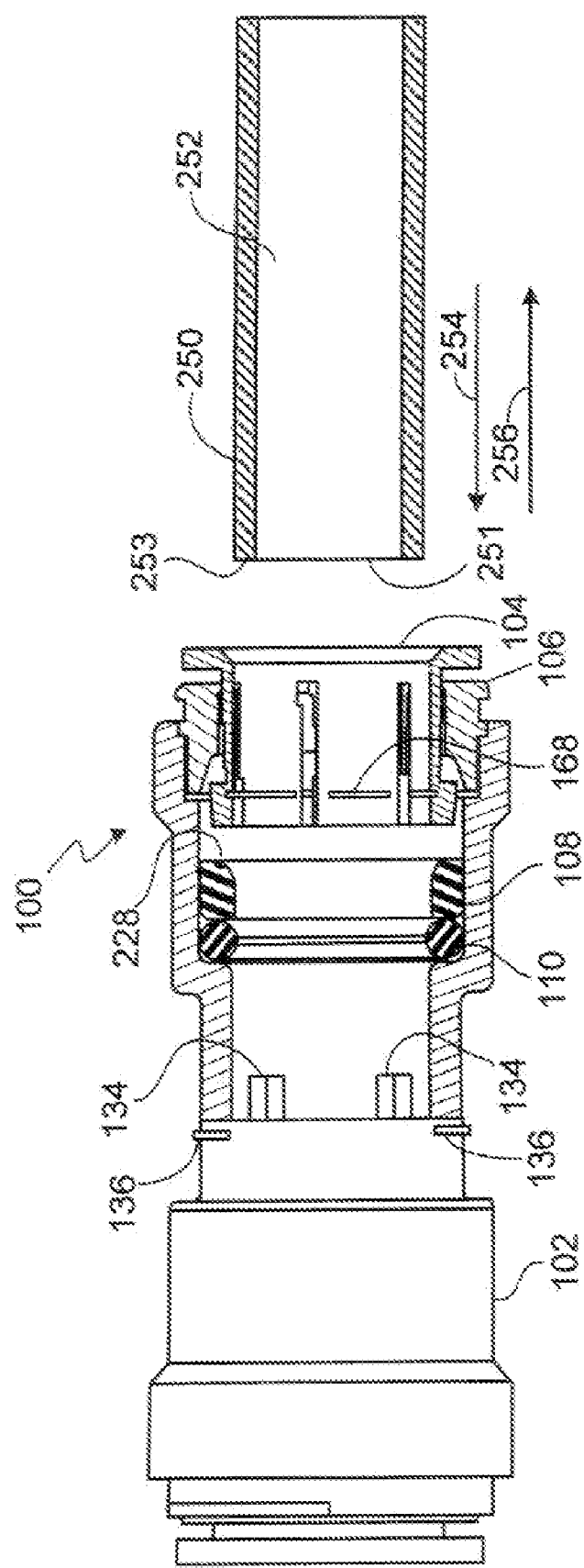
FIG. 5 is a partial cross section of a tubing piece being aligned with the connector of FIG. 1.
Figure 6:
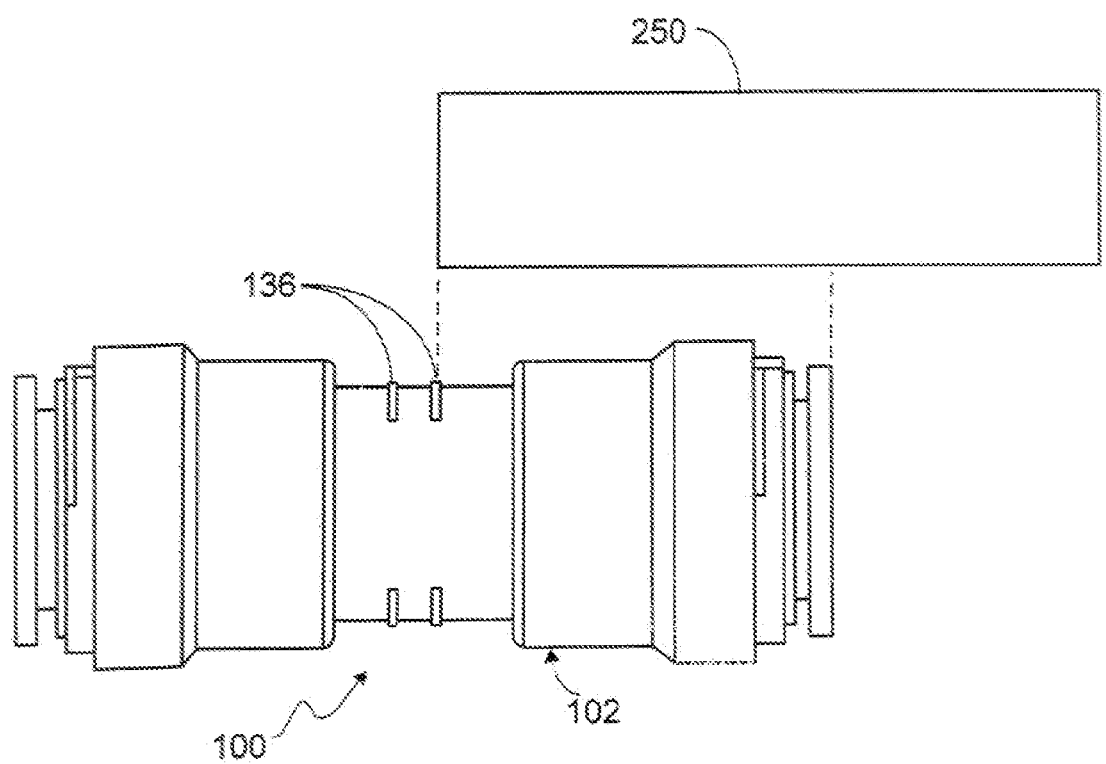
FIG. 6 is a side view of a tubing piece being marked using indicia present on the connector of FIG. 1.

In use and referring to FIG. 5, a tubing piece 350 is inserted into the present connector 100 to form a fluid-tight seal therebetween. Ideally, the tubing piece 350 is cut such that the end 351 to be inserted into the present connector is substantially orthogonal (square) to the connector exterior surface 352. The insertion depth is marked on the tubing 350 by aligning the tubing end 351 with the insertion depth line 136 present on the exterior surface of the connector body 102 and marking the tubing 350 at the end of the present assembled connector 100 (FIG. 6). The tubing 350 is then pushed into the connector 100 in the direction of the arrow 354 (FIG. 5) until the insertion mark on the tubing generally aligns with the collet rim 160. The term aligned is intended to mean that the longitudinal axis of the tubing piece 350 is substantially orthogonal to the plane of the O-ring. As the tubing 350 is inserted, the tubing edge 353 encounters the radiused surface 228 of the guide 108 and is thereby forced to squarely fit inside the O-ring 110 to provide a fluid-tight seal. If the tubing is pulled in a direction away from the present connector when seated therein (as indicated by the arrow 356), the tubing will be securely held as the lip portions of the collet sections 166 contact, and are forced (biased) inwardly by, the sloped collar inner surface 204. As the collet sections 166 are forced inwardly, the teeth 168 are forced against the tubing piece 350 to secure the tubing piece 350 firmly in place. By insuring the that tubing 350 alligns correctly with the O-ring 110, the present guide protects the O-ring from damage during connection, increases the side load capacity of the present connector, and prevents the O-ring from becoming dislodged during use.

The tubing can be removed from the present connector by pressing the collet 104 inwardly until the collet rim inboard surface 176 abuts the collar outboard surface 190 (FIG. 1), then pulling the tubing from the present connector in the direction of arrow 256 (FIG. 5). When in this position, the collet lip sections 166 are in a noncontacting relation with the sloped surface 204 of the collar 106 and a minimum of retaining force (friction) is applied by the collet teeth 168 against the tubing piece 250.

The present connector can be used to connect tubing made from multiple materials, e.g., copper, chlorinated polyvinylchloride (CPVC), cross-linked polyethylene (PEX), low density polyethylene (LDPE), medium density polyethylene (MDPE), and high density polyethylene (HDPE).

Figure 7:
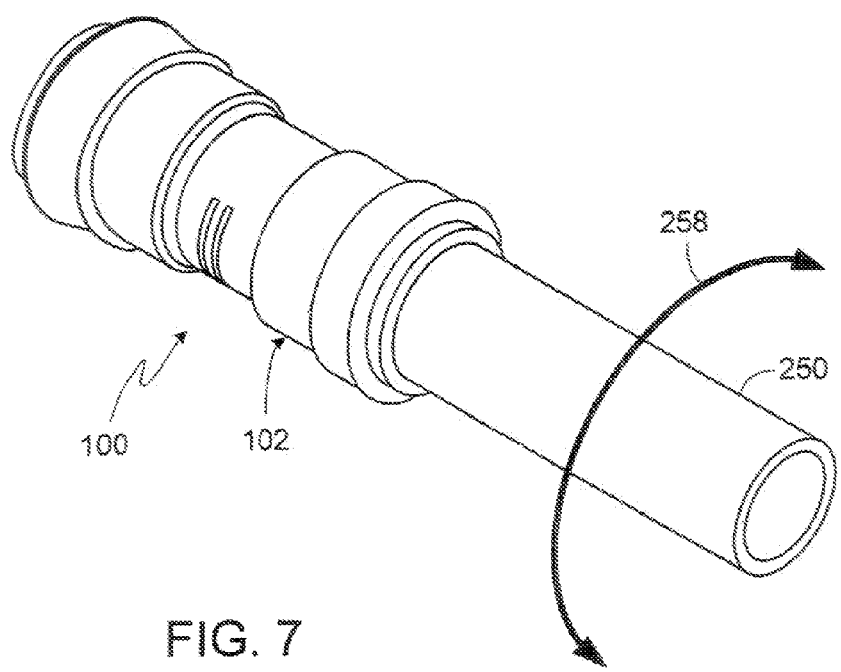
FIG. 7 is a perspective view of a joined tubing piece being rotated in the connector of FIG. 1.
Figure 8:
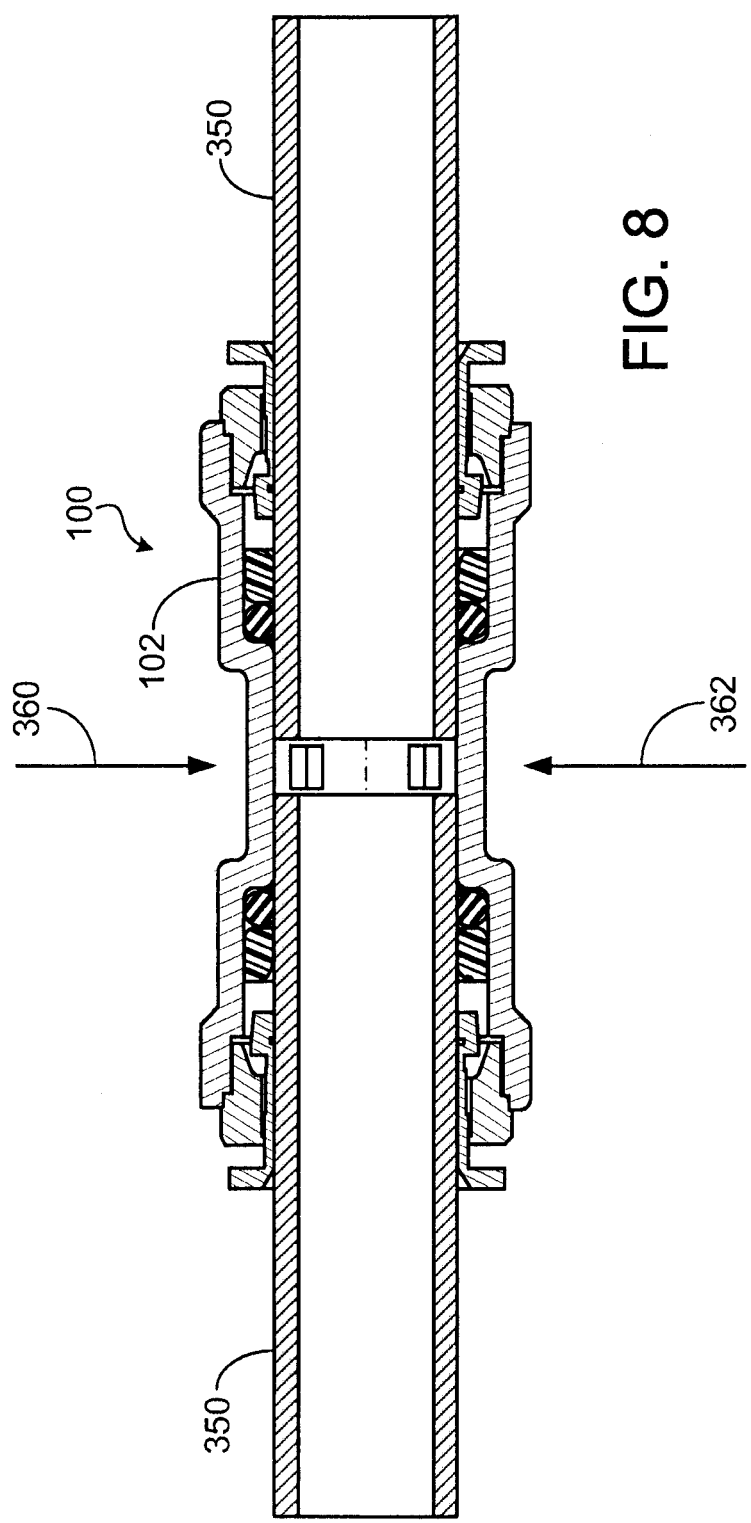
FIG. 8 is a cross section of two tubing pieces joined to the connector of FIG. 1.
Figure 9:
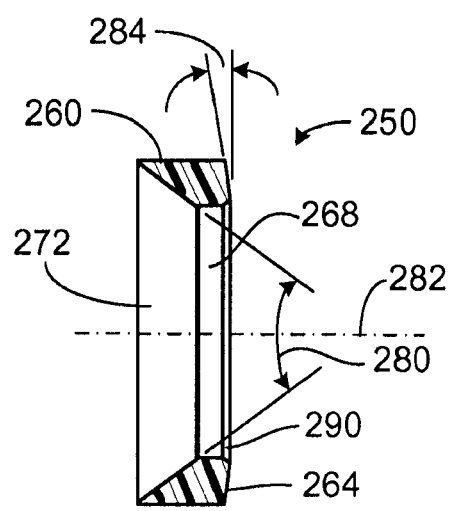
Figure 10:
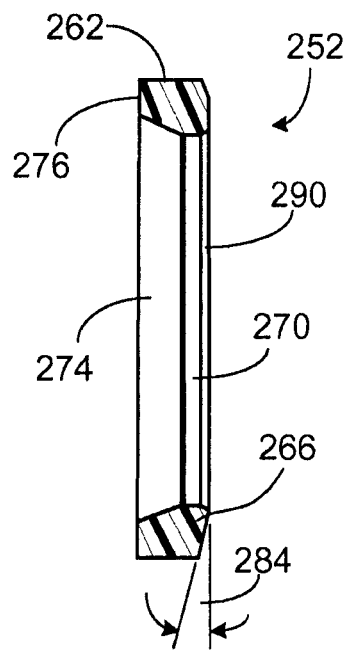

Because the stops 134 may extend from the inner surface 120 of the present connector body to distance generally equal to the thickness of the tubing to be connected, the present connector will conduct fluid therethrough at a flow rate substantially similar to the flow rate of the tubing itself. After a connection is made between the present connector and tubing, the tubing can swivel (rotate) within the connector (as indicated by arrow 258 in FIG. 7) even when a maximum of fluid pressure is present. This ability to rotate the under when fluid pressure is present insures a fluid-tight connection under conditions when reconnected tubing pieces twist or vibrate. Because the present guide maintains alignment of the tubing 250 within the o-ring 110, the fluid-tight seal between the tubing surface 252 and o-ring 110 is maintained even when substantial lateral forces (indicated by arrows 260 and 262 in FIG. 8) are exerted on the connector 100.

Because numerous modifications of this invention may be made without departing from the spirit thereof, the scope of the invention is not to be limited to the embodiments illustrated and described. Rather, the scope of the invention is to be determined by the appended claims and their equivalents.

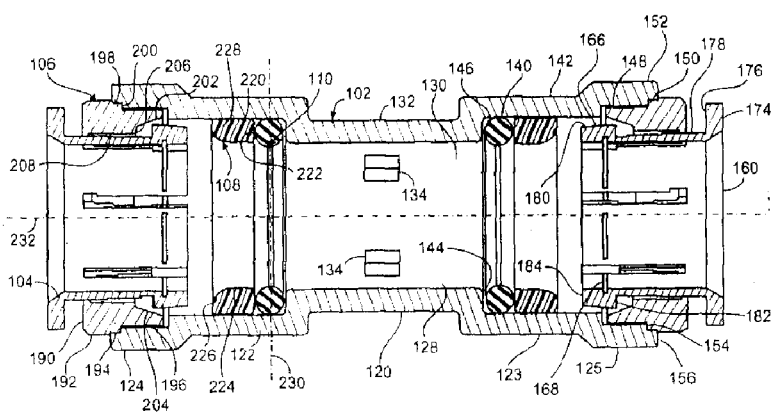

What is claimed is:

1. A connector, comprising:
   a connector body defining a fluidic connector passageway having a longitudinal axis, a first section, and a second section outboard the first section, wherein the second section is radially stepped out from the first section so that a contact surface is formed at an end of the first section, an interior surface of the second section having a constant inner radius about the longitudinal axis;
   a collet disposed in an open end of the connector body passageway and extending inboard into the second section of the connector body and towards the contact surface;
   a resiliently flexible o-ring disposed in the second section of the connector passageway between the collet and the contact surface of the body; and
   a ring guide positioned in the second section of the connector passageway between the o-ring and the collet and including,
      an interior surface having a radius greater than an inner radius of the o-ring,
      an exterior surface spaced radially outwardly from the interior surface, the exterior surface having a radius about equal to an outer radius of the o-ring, wherein the ring guide and the o-ring are sized so that the exterior surface of the ring guide and the outer radius of the o-ring are in sliding contact with an interior surface of the second section of the connector body;
      an inboard surface for contacting the o-ring extending from the interior surface to the exterior surface, wherein at least a portion of the inboard surface is frustoconical and extends towards the o-ring from the exterior surface, and
      an outboard surface for contacting the collet extending between the interior surface and the exterior surface, wherein at least a portion of the outboard surface is one of radiused and frustoconical and extends towards the collet from the interior surface.

2. The connector of claim 1, wherein the outboard surface of the ring guide includes a flat section extending from the exterior surface of the ring guide perpendicular to the longitudinal axis of the body and a frustoconical section extending inboard at an angle from the flat section to the interior surface.

3. The connector of claim 1, wherein the outboard surface of the ring guide includes a frustoconical portion and diagonally opposed portions of the frustoconical outboard surface extend in an angle of between about 50 degrees 80 degrees.

4. The connector of claim 3, wherein the diagonally opposed portions of the frustoconical outboard surface extend in an angle of between about 60 degrees and 73 degrees.

5. The connector of claim 1, wherein the frustoconical inboard surface of the ring guide departs from a generally perpendicular orientation with respect to the longitudinal axis at an angle of between about 5 degrees and 15 degrees.

6. The connector of claim 5, wherein the frustoconical inboard surface of the ring guide departs from a generally perpendicular orientation with respect to the longitudinal axis at an angle of between about 7.5 degrees and 12.5 degrees.

7. The connector of claim 1, wherein the connector body further includes a third section outboard the second section and radially stepped out from the second section, the connector further comprising a collar coaxially positioned in the third section to retain the collet within the connector body.

8. The connector of claim 1, wherein the ring guide is made of a thermoplastic resin.

9. The connector of claim 1, wherein the interior surface of the ring guide has a radius substantially equal to a radius of an interior surface of the first section of the connector body.

* * * * *

UNITED STATES PATENT AND TRADEMARK OFFICE
CERTIFICATE OF CORRECTION

PATENT NO. : 7,354,079 B2
APPLICATION NO. : 10/952484
DATED : April 8, 2008
INVENTOR(S) : Randall J. Rehder, Gary Hutko and L. James Knowles It is certified that error appears in the above-identified patent and that said Letters Patent is hereby corrected as shown below:

The Title Page showing the illustrative figure should be deleted to be replaced with the attached title page.

The Drawing Sheets, consisting of figs. 1-8 should be deleted to be replaced with the drawing sheets, consisting of figs. 1-8, as shown on the attached pages.

Signed and Sealed this

Thirteenth Day of July, 2010

David J. Kappos
*Director of the United States Patent and Trademark Office*

(12) United States Patent
Rehder et al.

(10) Patent No.: US 7,354,079 B2
(45) Date of Patent: Apr. 8, 2008

(54) CONNECTOR

(75) Inventors: Randall J. Rehder, Wilmington, NC (US); Gary Butko, Wilmington, NC (US); L. James Knowles, Wilmington, NC (US)

(73) Assignee: Watts Sea Tech, Inc., North Andover, MA (US)

( * ) Notice: Subject to any disclaimer, the term of this patent is extended or adjusted under 35 U.S.C. 154(b) by 161 days.

(21) Appl. No.: 10/952,484

(22) Filed: Sep. 28, 2004

(65) Prior Publication Data

US 2005/0275221 A1 Dec. 15, 2005

Related U.S. Application Data

(63) Continuation-in-part of application No. 10/406,639, filed on Apr. 2, 2003, now abandoned.

(60) Provisional application No. 60/374,709, filed on Apr. 23, 2002.

(51) Int. Cl.
F16L 21/06 (2006.01)

(52) U.S. Cl. .................. 285/322; 285/323; 285/307

(58) Field of Classification Search ............... 285/322, 285/307, 319, 323, 243
See application file for complete search history.

(56) References Cited

U.S. PATENT DOCUMENTS

| | | | |
|---|---|---|---|
| 2,485,874 A * | 10/1949 | Forst | 72/409.03 |
| 2,635,901 A * | 4/1953 | Osborn | 285/33 |
| 3,653,689 A * | 4/1972 | Sapy et al. | 285/113 |
| 4,059,295 A | 11/1977 | Helm | |
| 4,573,716 A | 3/1986 | Guest | |
| 4,606,783 A | 8/1986 | Guest | |
| 4,645,246 A | 2/1987 | Guest | |
| 4,657,286 A | 4/1987 | Guest | |
| 4,722,560 A | 2/1988 | Guest | |
| 4,807,911 A | 2/1989 | Short | |
| 4,946,213 A | 8/1990 | Guest | |
| 5,029,908 A | 7/1991 | Belisaire | |
| 5,038,455 A | 8/1991 | Guest | |
| 5,174,611 A | 12/1992 | Byrd et al. | |
| 5,230,539 A | 7/1993 | Olson | |
| 5,487,572 A | 1/1996 | Combot-Courrau et al. | |
| 5,549,865 A | 8/1996 | Guests | |

(Continued)

FOREIGN PATENT DOCUMENTS

EP 0 268 511 A1 10/1987

(Continued)

*Primary Examiner*—David Bochna
(74) *Attorney, Agent, or Firm*—Fish & Richardson P.C.

(57) ABSTRACT

A tube connector including a tubular connector body having an inboard contact surface facing an outboard open end, a collet extending into the open end and towards the contact surface, and an o-ring positioned between the collet and the contact surface. The o-ring provides a fluid-tight seal between the connector body and an outer circumference of a tube inserted through the collet and into the connector body. The connector also includes a relatively rigid ring guide positioned between the o-ring and the collet. The ring guide is adapted to protect the o-ring and maintain the o-ring in a proper position for providing a fluid-tight seal and includes a sloped or radiused outboard surface for guiding an inserted tube and a sloped inboard surface for contacting the o-ring.

9 Claims, 8 Drawing Sheets